United States Patent [19]
Yokoi

[11] Patent Number: 4,729,563
[45] Date of Patent: Mar. 8, 1988

[54] ROBOT-LIKE GAME APPARATUS

[75] Inventor: Gunpei Yokoi, Kyoto, Japan

[73] Assignee: Nintendo Co., Ltd., Kyoto, Japan

[21] Appl. No.: 813,257

[22] Filed: Dec. 24, 1985

[30] Foreign Application Priority Data

Dec. 28, 1985 [JP] Japan ................. 59-275475

[51] Int. Cl.⁴ ............................................. A63F 9/22
[52] U.S. Cl. .............................. 273/1 E; 273/DIG. 28;
446/175; 364/513; 901/47
[58] Field of Search .................. 446/175; 364/513;
273/1 E, DIG. 28; 901/47

[56] References Cited

U.S. PATENT DOCUMENTS

| | | | |
|---|---|---|---|
| 2,540,144 | 2/1951 | Stern | 273/DIG. 28 |
| 3,095,653 | 6/1963 | Corrigan | 35/9 |
| 4,086,724 | 5/1978 | McCaslin | 446/175 |
| 4,201,012 | 5/1980 | Marshall | 446/175 |
| 4,329,684 | 5/1982 | Monteath | 340/307 |
| 4,395,045 | 6/1983 | Baer | 273/312 |
| 4,398,720 | 8/1983 | Jones et al. | 273/238 |
| 4,496,158 | 1/1985 | Baer | 273/DIG. 28 |
| 4,583,950 | 4/1986 | Schroeder | 434/22 |
| 4,613,942 | 9/1986 | Chen | 364/513 |
| 4,659,919 | 4/1987 | Price | 250/209 |
| 4,675,519 | 6/1987 | Price | 250/209 |

FOREIGN PATENT DOCUMENTS 2547185 4/1977 Fed. Rep. of Germany .......... 128/1

OTHER PUBLICATIONS

"Game Player", Sep. 1985, issue of *Popular Science*, p. 64.

*Primary Examiner*—Leo P. Picard
*Attorney, Agent, or Firm*—Larry A. Jackson

[57] ABSTRACT

A robotic game apparatus comprises a CRT display. A robot has a photo detector which faces a screen of the CRT display and detects an image on the screen. On the screen of the CRT display, images which differ, for example, in brightness or the like are formed in response to different codes. The photo detector of the robot generates a code signal responding to a change in image brightness or the like. This code signal is decoded, and motors or the like are controlled to cause corresponding movements of the arms and body of the robot.

17 Claims, 28 Drawing Figures

ROBOT-LIKE GAME APPARATUS

BACKGROUND OF THE INVENTION

1. Field of the Invention

The present invention relates to a robotic game apparatus. More specifically, the present invention relates to a novel robotic game apparatus wherein a robot is controlled by an image which is formed by a displaying means.

2. Description of the Prior Art

Heretofore, robots of the kind disclosed by the present invention have not existed.

SUMMARY OF THE INVENTION

Therefore, a principal object of the present invention is to provide a quite novel robotic game apparatus.

In brief, the present invention is an amusement apparatus wherein a game robot is controlled by an image of a certain form (brightness, color or shape) presented on a displaying means such as a CRT display. The game robot receives the image and performs a predetermined operation in response to the form of the displayed image.

The displaying means displays a command or data for controlling motion of the robot. The robot receives the image formed on the displaying means, for example, using a photo detector or the like, and, for example, converts the received image into a code in response to received brightness information, color information or shape information of the image. A robot controlling means drives motors or the like for moving each part of the robot, for example, its arms, in response to the code.

In accordance with the present invention, such a robotic game device can be utilized advantageously, for example, as a video game apparatus or the like.

These objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 7A through FIG. 7C are illustrative views showing arms of the robot, in which FIG. 7A shows a state wherein the arms are opened, FIG. 7B shows a state wherein the arms are closed, and FIG. 7C shows a state wherein a pin is inserted through elongated holes on supporting pieces of the arms.

DESCRIPTION OF THE PREFERRED EMBODIMENTS

Figure 1:
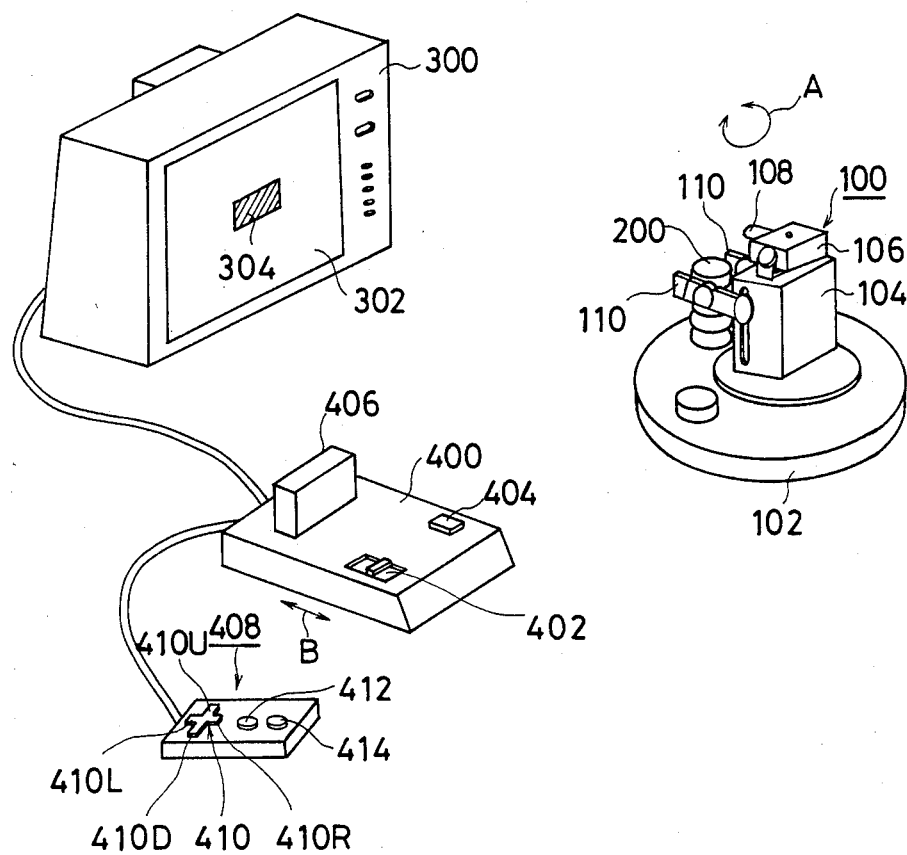
FIG. 1 is a perspective view showing the complete configuration of one embodiment in accordance with the present invention.

FIG. 1 is a view showing one complete embodiment in accordance with the present invention. A robot 100 is provided, and this robot 100 comprises a robot main unit 104 which is installed on a base 102 so as to be rotatable in the direction shown by an arrow A. A head 106 is installed on this robot main unit 104. In the front of the head 106, an image receiving device or part 108 is formed which protrudes forward and acts as an "eye". On both side parts of the robot main unit 104, arms 110 are installed respectively, and an object 200 can be clamped or released by these arms 110.

On the other hand, a CRT display 300 is installed which constitutes a displaying means. In this embodiment, a television receiver is employed for the CRT display 300. A specific area 304 is formed on nearly the center of the screen 302 of this CRT display 300. The image receiving part 108 installed at the head 106 of the robot 100 receives the brightness information, color information or shape information contained in an image formed on this specific area 304, or a combination of such information. Thereby, a driving means (not illustrated) installed in this robot 100 moves each part of the robot, particularly the arms 110 or the like, in response to the received information.

An image processing part 400 is connected to the CRT display 300 to give an image signal thereto. As an example of this image processing part 400, the "Nintendo Entertainment System (trade mark)" manufactured by the assignee of the present invention can be utilized. In the image processing part 400, a power switch 402 is provided for switching a power source 402 to ON or OFF by sliding it in the direction as shown by an arrow B and a reset switch 404 is provided for resetting a CPU (described later) contained in this processing part 400. Also, a cassette 406 comprising a ROM described later having a program written for image processing, is loaded in this image processing part main unit 400 in an insertable/removable manner.

An operating part 408 is connected to the image processing part main unit 400. A cross-shaped key switch 410 and two key switches 412 and 414 are installed on the operating part 408. This cross-shaped key switch 410 comprises four press points 410U, 410D, 410R and 410L, and when each press point is depressed, a different kind of key code signal is given to the image processing part main unit 400. The press point 410U or 410D is utilized when inputting a command for moving the arms 110 of the robot 100 upward or downward. The press point 410R or 410L is utilized for inputting a command for rotating the robot main unit 104 clockwise or counterclockwise in the direction as shown by the arrow A. The key switch 412 or 414 is utilized for inputting a command signal for closing or opening the arms 110.

To be brief, in this embodiment, an image is displayed in a form that is responsive to an operation of the operating part 408 on the specific area 304 of the screen 302 of the CRT display 300 based on an image signal from the image processing part main unit 400. The image displayed on this specific area 304 is received by the image receiving part 108 of the robot 100. The robot main unit 104 is rotated clockwise or counterclockwise and the arms 110 are moved up or down, or opened or closed in response to a signal from the image receiving part 108. Accordingly, the robot 100 can hold and move the object 200.

Next, a detailed description is made of the robot 100 in reference to FIG. 2 through FIG. 8. The head 106 of the robot 100 is mounted on the robot main unit 104 by a U-shaped bracket 112. More specifically, supporting shafts 114 (FIG. 3) are formed at both sides of the head 106, and these supporting shafts 114 are mounted by screws 116 penetrating through holes (not illustrated) formed at both end parts of the bracket 112 so as to be rotatable with these supporting shafts 114 centered. Accordingly, this head 106 is constituted in a manner that can turn up or down as shown by an arrow C in FIG. 4 by means of the shafts 114.

Figure 5:
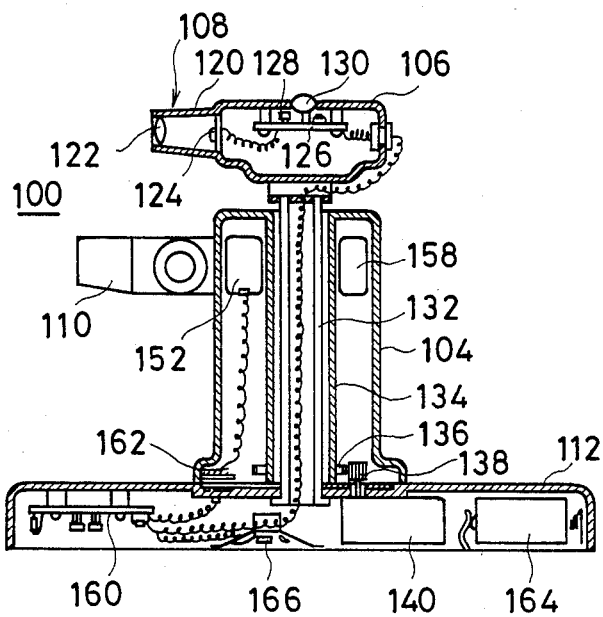
FIG. 5 is a cross-sectional illustrative view showing the interior construction of the robot.

The image receiving part 108 is installed in the front of the head 106, and this image receiving part 108 comprises a cylindrical protrusion 120. A condensing lens 122 is installed at the tip of this protrusion 120 as shown in FIG. 5. An image received by this condensing lens 122 is focused into a photo detector 124 (for example, photo transistor) mounted on the inner part of the protrusion 120. The light received by this photo detector 124 is converted into an electric signal and is amplified by an input amplifier 128 which is formed on a board 126 installed in the head 106, and is applied to a robot controlling part as described later. In addition, a light emitting device 130, for example, LED is mounted on the top surface of the head 106, and this light emitting device 130 is lit when an image, that is light is received by the photo detector 124.

Figure 6:
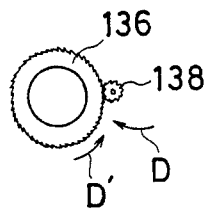
FIG. 6 is an illustrative view showing one example of a gear construction for rotating a robot main unit.

As is apparent from FIG. 5, a hollow-cylinder-shaped shaft 132 is installed in the robot main unit 104 while penetrating through nearly the center thereof. A lead or the like for inputting an electric signal from the head 106 to the robot controlling part as described later is inserted through the hollow part of this shaft 132. Then, a sleeve 134 (FIG. 5) is formed along the peripheral surface of this shaft 132. The robot main unit 104 itself is supported by this sleeve 134 in a manner so that it can rotate as a unit. A follower gear 136 is fixed to the bottom end of the sleeve 134. A driving gear 138 is engaged with this follower gear 136 as shown in FIG. 6. Accordingly, when the driving gear 138 is driven to rotate in the direction as shown by an arrow D in FIG. 6, responsively, the follower gear 136 is also rotated in the direction as shown by an arrow D'. Therefore, the whole of the robot main unit 104 can rotate as a unit independent of the base 102 in the direction as shown by the arrow A in FIG. 1.

Meanwhile, the driving gear 138 is driven by a first motor 140 accommodated in the inner part of the base 102.

Figure 2:
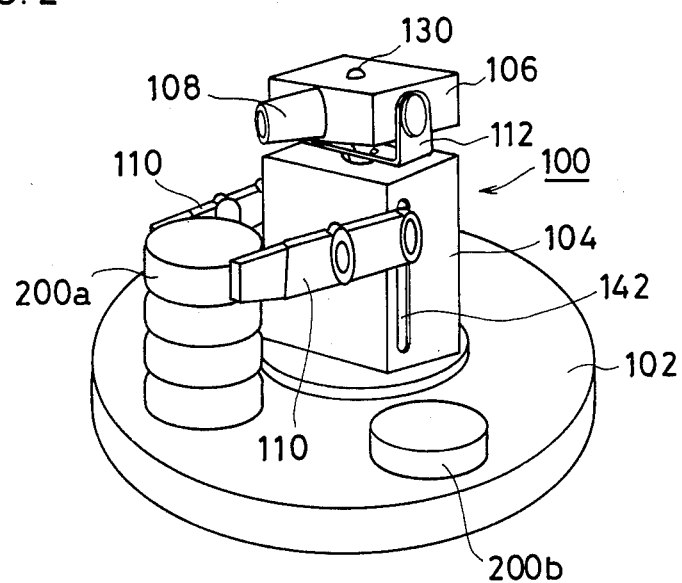
FIG. 2 is a perspective view showing a robot.
Figure 3:
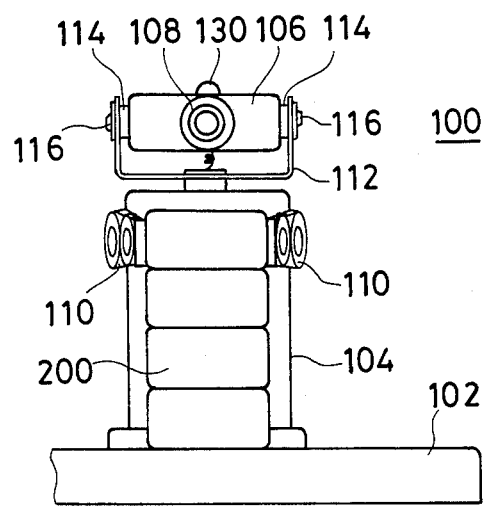
FIG. 3 is a front view showing the robot.
Figure 4:
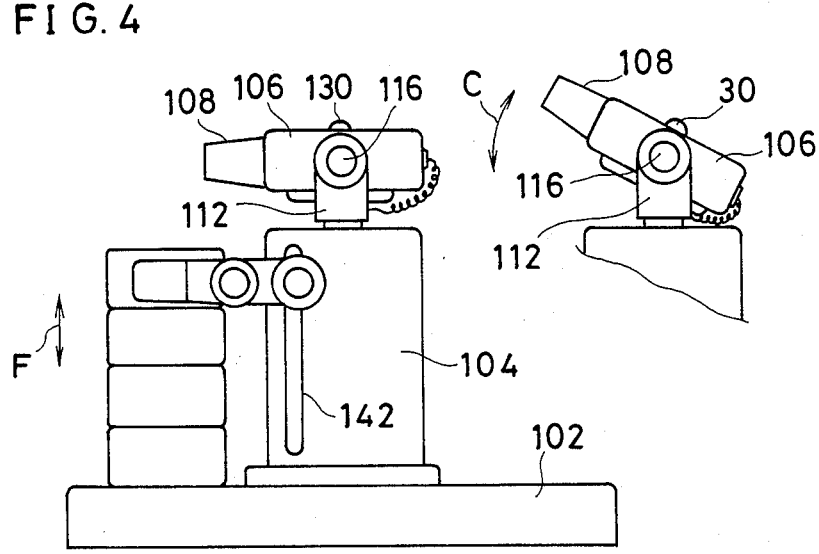
FIG. 4 is a side view showing the robot.
Figure 7A:
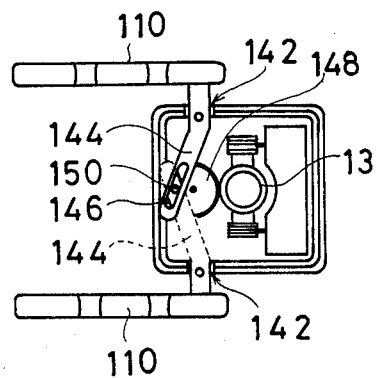
Figure 7B:
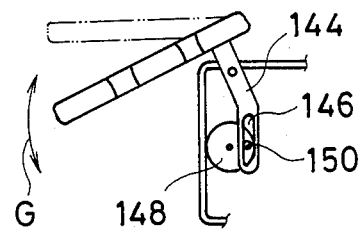
Figure 7C:
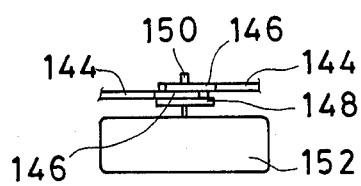

As shown in FIG. 4, elongated holes 142 are formed on both side parts of the robot main unit 104 along nearly a total length in the direction of height thereof. Supporting pieces 144 bent at an obtuse angle and are installed in a manner to pass through these holes 142 as shown in FIG. 7A through FIG. 7C. One end of this supporting piece 144 is combined with the other supporting piece in the robot main unit 104. Also, the arm 110 is fixed to the end part of the supporting piece 144 located outside the robot main unit 104, and an elongated hole 146 is formed at the free end side of the supporting piece 114. Then, the two supporting pieces 144 for the both arms 110 are superposed as shown in FIG. 7C, and a pin 150 fixed to a rotary plate 148 is inserted through these holes 146 in common. The rotary plate 148 can be coupled to an output shaft of a second motor 152. As is obvious from FIG. 5, this second motor 152 is, for example, accommodated in the robot main unit 104. When this motor 150 is driven, the rotary plate 148 is rotated, and the pin 150 is brought to a position as shown in FIG. 7A or FIG. 7B. In a state as shown in FIG. 7A, the tips of the arms 110 are opened. In a state as shown in FIG. 7B, the tips of the arms 110 are closed. Thus, the arms 110 can be controlled to be put in "opened" state or "closed" state by driving the second motor 152. By such motions of the arms 110, the object 200 can be clamped therebetween as shown in FIG. 2.

Then, the object 200 can be carried to another position by rotating the robot main unit 104 as described above in the state wherein the object 200 is clamped by the arms 110.

Figure 8:
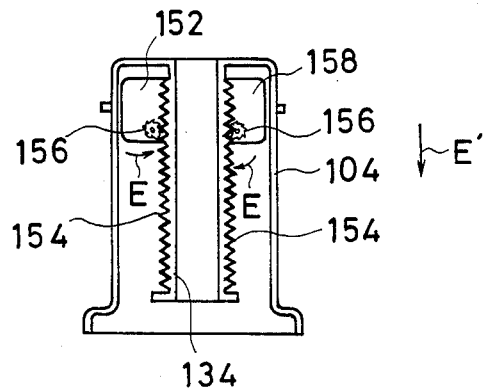
FIG. 8 is an illustrative view showing one example of a gear construction for moving the arms upward or downward.

As shown in FIG. 8, gear racks 154 are formed on both side faces of the sleeve 134 of the robot main unit 104. Then, two pinions 156 are installed so as to engage with these racks 154 of both sides, and these pinions 156 are driven by a third motor 158. Then, the above-described supporting pieces 144 for the arms 110 and associated rotary plate 148 (FIG. 7A through FIG. 7C) and the like are installed in a manner that enables these parts to be moved as a unit together with this motor 158. Accordingly, if the pinions 156 are rotated, for example, in the direction as shown by an arrow E in FIG. 8 by driving the motor 158, responsively, the motor 158 is displaced in the direction as shown by an arrow E'. Accompanying on this displacement of the motor 158, the positions of the supporting pieces 144 connected thereto, that is the arms 110 in the direction of height is changed. In other words, the arms 110 can be displaced in the direction as shown by an arrow F in FIG. 4 by the third motor 158.

The third motor 158 is also accommodated in the robot main unit 104 together with the second motor 152. On the other hand, this robot main unit 104 is rotated by the first motor 140 as described previously. Accordingly, a control circuit board 160 for controlling robot is accommodated in the inside of the base 102 and cannot be connected directly to the two motors 152 and 158. Therefore, in this embodiment, as shown in FIG. 5, a rotary contact 162 which contacts slidably with a conductive pattern formed on a fixed disc in response to a rotation of the robot main unit 104 is installed in the lower part of the robot main unit 104. Accordingly, a driving signal or controlling signal is applied to the two motors 152 and 158 from the board 160 through the rotary contact 162 and leads extending therefrom.

Meanwhile, a battery 164 for providing power to various electric components as described above and a speaker 166 for producing a simulated sound are accommodated in the base 102 of the robot 100.

Thus, the robot main unit 104 can be rotated in the direction as shown by the arrow A in FIG. 1 by driving the first motor 140, the arms 110 can be opened or closed as shown by an arrow G in FIG. 7B by driving the second motor 152, and the arms 110 can be displaced in the direction as shown by the arrow F in FIG. 4 by driving the third motor 158.

Meanwhile, the head 106 is supported by the fixed shaft 132 as shown in FIG. 5, and therefore the image receiving part 108 thereof can be maintained all the time in the state of facing the specific area 304 (FIG. 1) of the screen 302 of the CRT display 300 even if the robot main unit 104 is rotated as described above.

Figure 9:
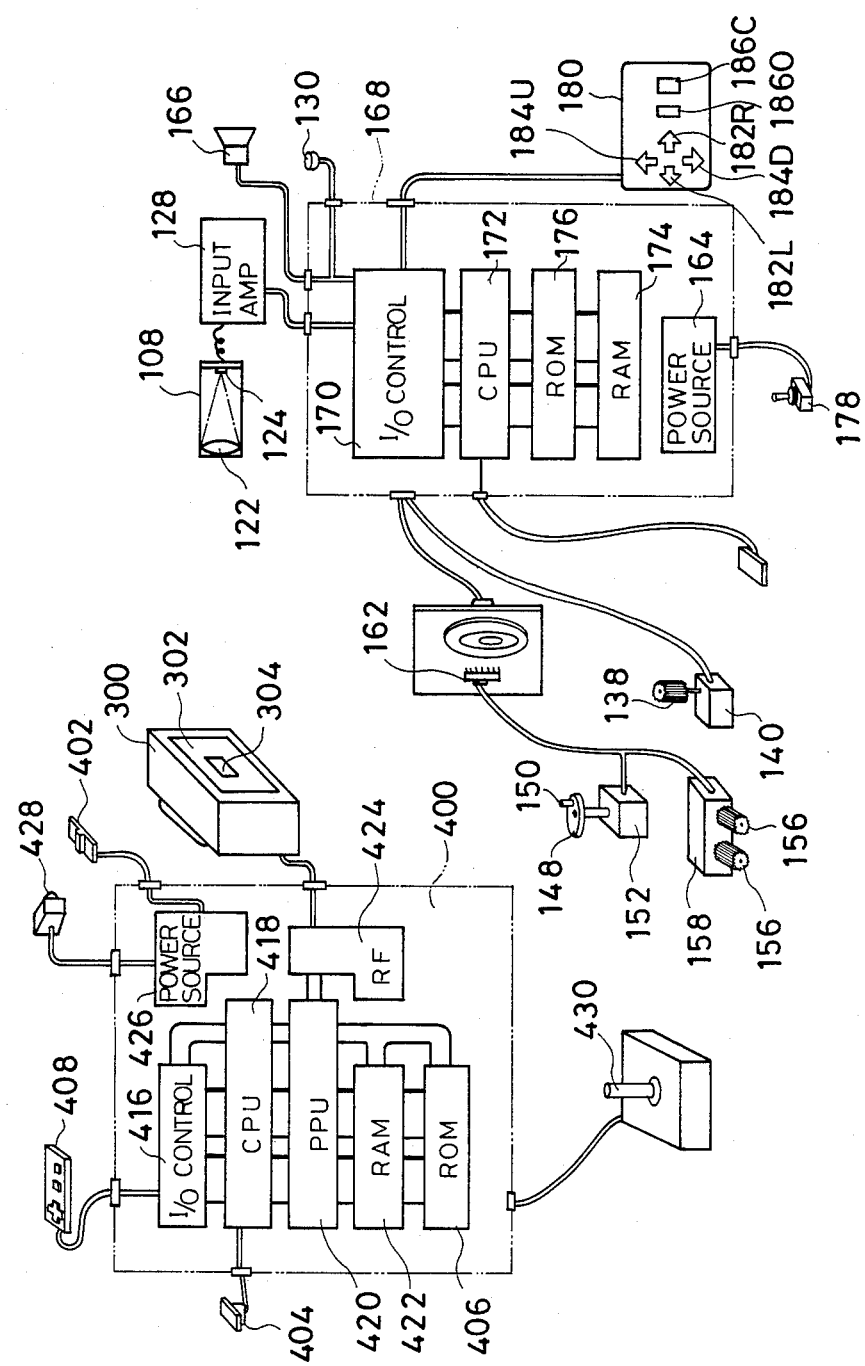
FIG. 9 is a schematic block diagram showing the configuration of the electrical control system of this embodiment.

FIG. 9 is a schematic block diagram showing the configuration of the electrical control for this embodiment. As described previously, the power switch 402, the reset switch 404 and the operating part 408 are connected to the image processing part 400. Then, a signal (key code) from the operating part 408 is applied to a CPU 418 through an input/output control 416. For this CPU 418, for example, the microprocessor "RP2A03" manufactured by Nintendo can be utilized. Then, a reset signal from the reset switch 404 is given directly to this CPU 418 as an interrupt signal. A PPU (picture processing unit) 420, a RAM 422 and the ROM 406 contained in a cassette which is loaded in the main unit 400 in an attachable/detachable fashion as shown in FIG. 1 are connected to the CPU 418. Then, for the PPU 420, the integrated circuit "2C03" manufactured by Nintendo can be utilized. Also, the RAM 422 accommodates the number of picture elements of the screen 302 of the CRT display 300. For this video RAM 422, for example, the integrated circuit "6116" manufactured by Hitachi or the like can be utilized. Although not illustrated, a character generator is installed in the image processing controlling part 400, and a character dot signal is given to the PPU 420 from this character generator in response to a selection of the CPU 418. Then, the character dot signal, namely, an image signal set by the CPU 418 is taken out from this PPU 420, and this image signal is converted into a television signal of the NTSC system, for example, by an RF circuit, namely, a modulating circuit 424. Then, this television signal is given to a television receiver, namely, the CRT display 300.

Alternatively, the image signal (video signal) may be applied to the CRT display 300 in place of an RF signal, or a an RGB signal may be used.

A power source 426 for supplying respective electric components with electric power is installed in the image processing part 400, and the power switch 402 and a pilot lamp 428 are connected to this power source 426 (FIG. 9).

As described above, the condensing lens 128 and the photo detector 124 are installed in the image receiving part 108 which receives the image formed in the specific area 304 on the screen 302 of the CRT display 300. An electric signal from this photo detector 124 is given to an input/output control 170 contained in a robot controlling part 168 through an input amplifier 128. This input/output control 170 gives a signal or data to a CPU 172, and also gives driving signals or controlling signals to each component such as motors based on a command from the CPU 172. Accordingly, the above-described LED 130 (refer to FIG. 2), speaker 166 (refer to FIG. 6) and first, second and third motors 140, 152 and 158 are connected to this input/output control 170. Meanwhile, the first motor 140 is connected directly, and as described above, the second and third motors 152 and 158 are connected through the rotary contact 162. A ROM 174 and a RAM 176 are connected to the CPU 172. Then, the power source 164 (refer to FIG. 5) such as a battery is contained in the robot controlling part 168, and this power source 164 is turned on or off by a power switch 178.

Figure 10:
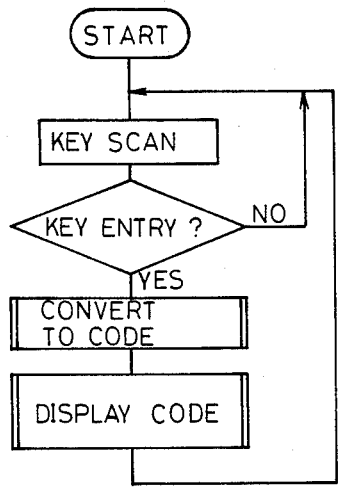
FIG. 10 is a flowchart showing a main routine of an image processing operation of the electrical system.
Figure 11:
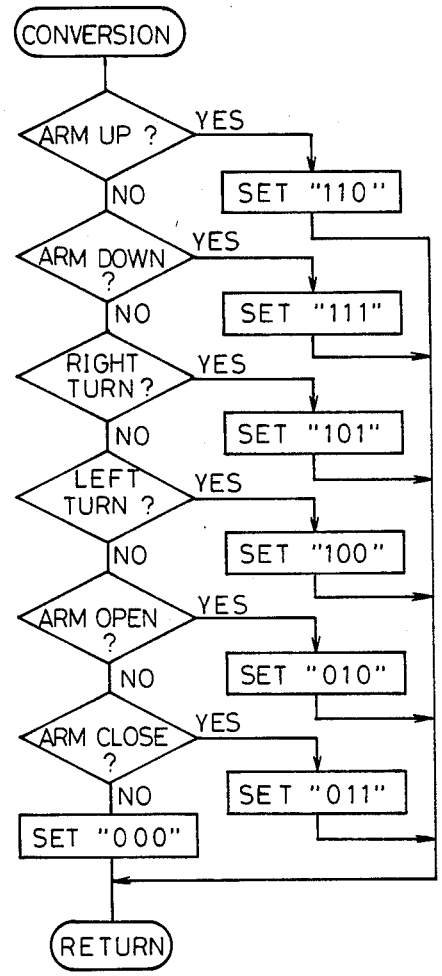
FIG. 11 is a flowchart showing a subroutine for code conversion in the image processor.
Figure 12:
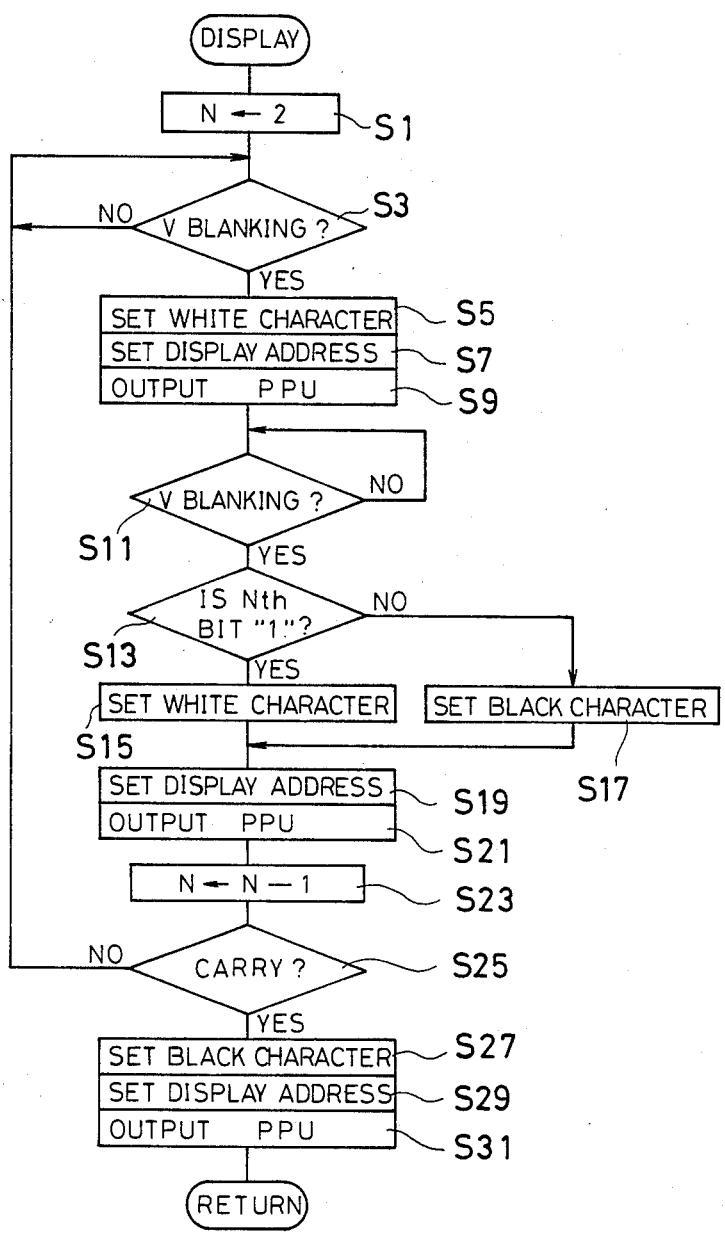
FIG. 12 is a flowchart showing a subroutine for code display in the image processor.

FIG. 10 through FIG. 12 are flowcharts for explaining operation of the image processing part 400. The CPU 418 contained in the image processing part 400 checks a signal from the input/output control 416 and detects whether or not any signal from the operating part 408 has been inputted, that is, whether or not a key input has been given. Then, if a key input has been given, the key input is converted into a predetermined code in the next step, and subsequently the code is displayed in the specific area 304 on the screen 302 of the CRT display 300.

In the subroutine for code conversion, as shown in FIG. 11, based on signals from the cross-shaped key switch 410 and the key switches 412 and 414 of the operating part 408, codes corresponding respectively thereto are set, for example, in an A-register or a working register (not illustrated) contained in the CPU 418. As described previously, the cross-shaped key switch 410 comprises the four press points 410U, 410D, 410R and 410 L.

The press point 410U is depressed when moving the arms 110 of the robot 100 upward, and when this press point 410U is depressed, the CPU 418 reads a code "110" from a decoder (not illustrated) of the associated ROM 416 (which is attached as a cassette), setting it in the A-register or the working register. The press point 410D is utilized for moving the arms 110 of the robot 100 downward, and when this press point 410D is depressed, the CPU 418 reads a code "111" from the ROM 406, setting it. The press point 410R is used for rotating the robot main unit 104 clockwise, and when this press point 410R is depressed, the CPU 418 sets a code "101". The press point 410L is utilized for rotating the robot main unit 104 counterclockwise, and when this press point 410L is depressed, a code "101" is set.

The key switch 412 is utilized for opening the arms 110, that is, for putting them in the state of FIG. 7A, and when this key switch 412 is depressed, a code "010" is set. The key switch 414 is utilized for closing the arms 110, that is, for putting them in the state of FIG. 7B, and when this key switch 414 is depressed, a code "011" is set.

Meanwhile, in this subroutine for code conversion, when a key input other than any one of the above-described key inputs is given, a code "000" is set and processing returns to a main routine (FIG. 10).

Next, a subroutine for code display as shown in FIG. 12 is executed. In this subroutine for code display, basically, a preceding digit of the code is displayed for every frame of the television signal of the NTSC system.

In this subroutine, in the first step S1, since the code is of three digits, a numeric value "2" is set in a counter of count-down system (not illustrated) in the CPU 418. Then, in the next step S3, the CPU 418 decides whether or not the CRT display 300, that is, the television signal is in the V (vertical) blanking period, and when the V blanking period is reached, in the next step S5, the CPU 418 sets a character code for white character as a trigger bit for the character generator (not illustrated), and also in step S7, it sets an address of the specific area 304 (FIG. 1) for the display for the video RAM 422. Thus, addition of the trigger bit enhances the accuracy of transmitting a signal or data to the robot 100 from the specific area 304 (FIG. 1), and this trigger bit is inserted for every digit of the code. Then, in step S9, an image signal of white character is outputted from the PPU 420, being modulated into a television signal by the RF circuit 424. Responsively, the white character as a trigger bit is displayed on the specific area 304 of the CRT display 300. This display persists for a predetermined time during the period of one frame.

Then, in the next step S11, the CPU 418 decides again whether or not the display is in the V blanking period, and when the V blanking period is sensed, in step S13, the CPU 418 checks the code set in the A-register or working register (not illustrated) contained therein, deciding whether or not the N-th bit of the code is "1". If that digit of the code is "1", in step S15, the white character is set in the PPU 420 as in the previous case, and in reverse, if that digit is "0", in step S17, the black character is set. Then, in either case, thereafter, in step S19, an address of the video RAM 422 for displaying that character is set, and in step S21, an image signal for that white character or black character is outputted.

Thus, if 1-bit display is performed, in step S23, the CPU 418 decrements the content of the above-described counter associated therewith. Then, at that point, the CPU 418 decides whether or not a carry or borrow has taken place in that counter. If a carry has taken place here, it means that all of these three digits have been displayed, and in steps S27 through S31, the CPU 418 sets the black character and also sets the display address, and an output is sent from the PPU 420.

If no carry has taken place in the counter, processing returns to the second step S3 in FIG. 12, displaying the trigger bit and the code bits following it in the same manner.

Figure 13:
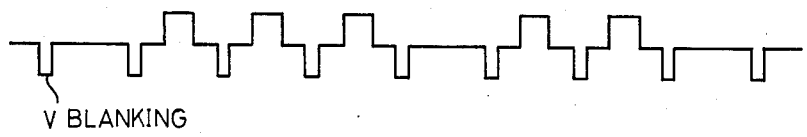
FIG. 13 is a waveform graph showing one example of an image signal displayed according to FIG. 12.

In accordance with this FIG. 12, for example, the code "101" in the case where the press point 410R of the cross-shaped key switch 410 is depressed is converted into an image signal as shown in FIG. 13 and is outputted from the PPU 420. That is, after every V blanking, following the trigger bit, a code "1" is displayed by white and a code "0" is displayed by black, respectively.

Figure 14:
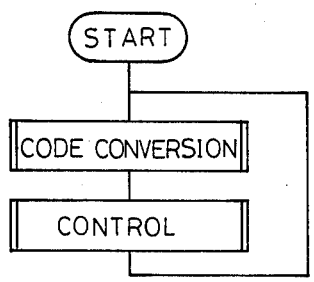
FIG. 14 is a flowchart showing a main routine of a robot controlling operation of the electrical system.
Figure 16:
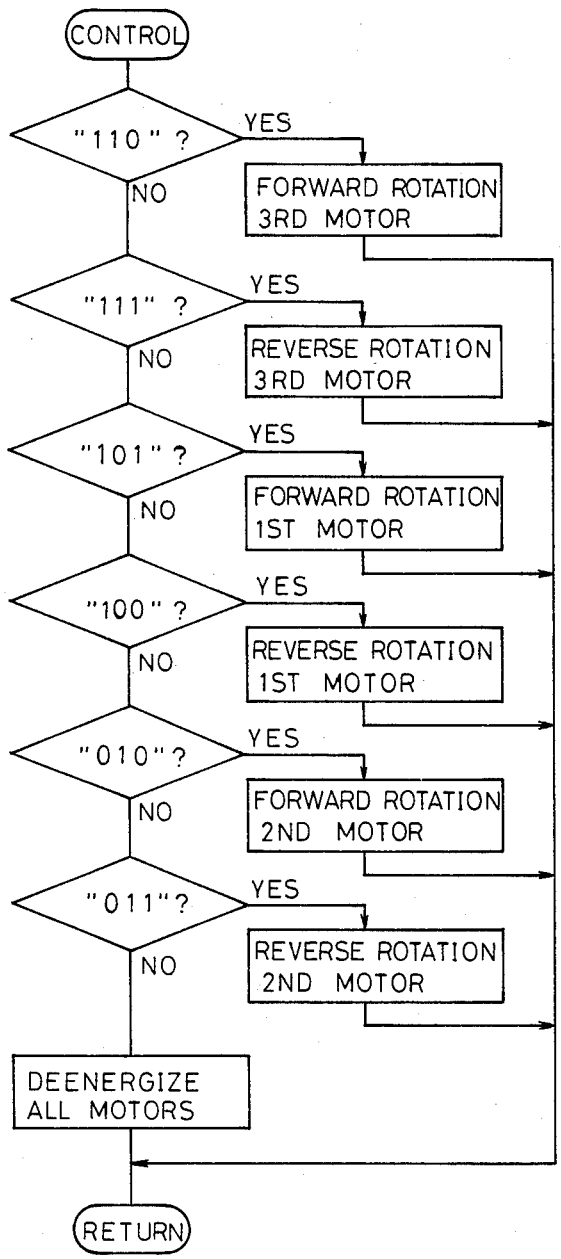
FIG. 16 is a flowchart showing a control subroutine of the robot controlling operation.
Figure 15:
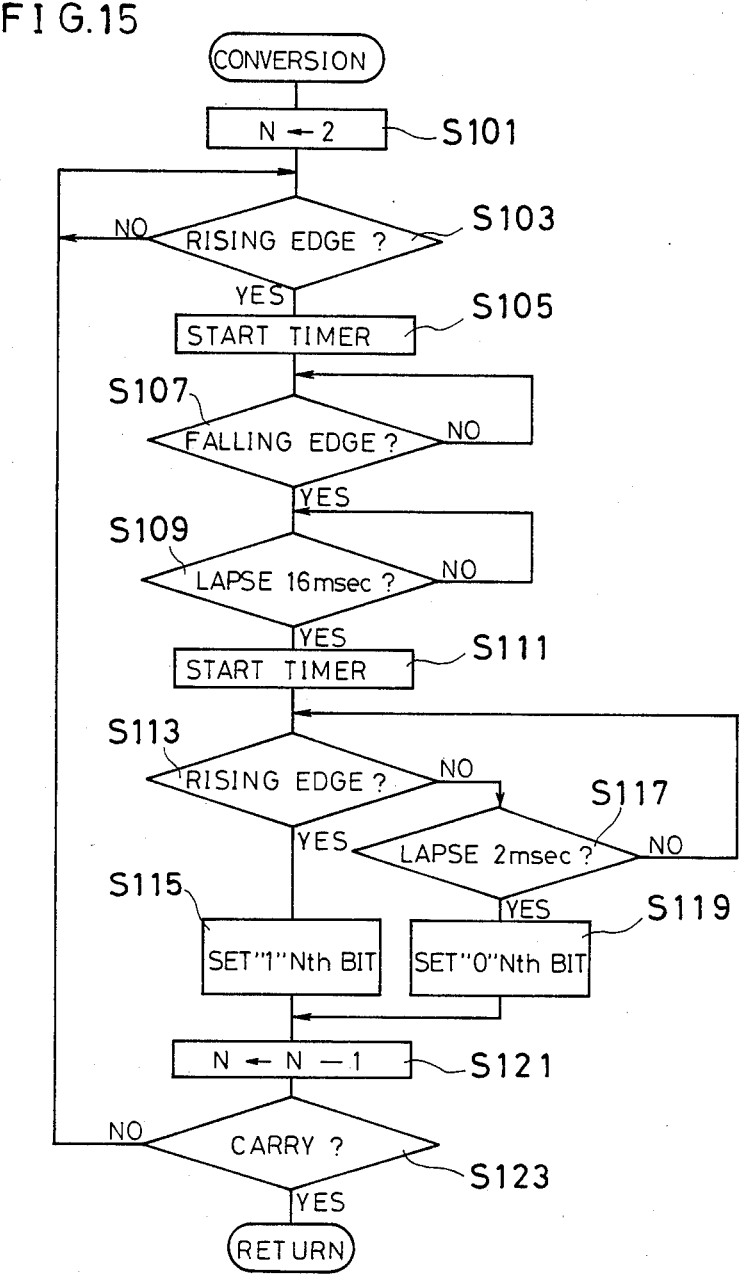
FIG. 15 is a flowchart showing a subroutine for code restoration or code conversion in the robot controlling operation.

Next, a description is made of the operation of the robot controlling part in reference to FIG. 14 through FIG. 16.

In the robot controlling part 168 (FIG. 9), as shown in FIG. 14, mainly the subroutine for code conversion and the subroutine for control are executed.

In the first step S101 of the subroutine for code conversion as shown in FIG. 15, the CPU 172 comprised in the robot controlling part 168 sets a numeric value "2" in a counter contained therein (not illustrated). Then, in step S103, the CPU 172 checks a signal from the input-/output control 170, and decides whether or not a signal from the input amplifier 128 has risen. That is, in this step S103, the CPU 172 decides whether or not an image output (light output) from the CRT display 300 has been given. Then, the CPU 172 detects a rise, and thereafter in step S105, the CPU 172 gives a start signal to a timer associated therewith, in step S107, the CPU 172 detects a fall of the signal from the input amplifier 128 in the same manner. The trigger bit is detected in these two steps S103 and S107.

Thereafter, in step S109, after deciding a lapse of 16 msec, the CPU 172 starts the timer again in step S111. The reason why the lapse time is selected 16 msec is that it is necessary to detect a presence of data for approximately 2 msec at the timing before the screen is rewritten for every 16.6 msec (1 V=16.6 msec) in the NTSC system. Then, in step S113, the CPU 172 decides whether or not a rise of the signal from the input amplifier 128, namely, the white character has been displayed on the specific area 304 of the CRT display 300. Accordingly, this "16 msec" means to read the code display, namely, the command data after a lapse of 16 msec from a detection of the trigger bit.

Then, if a rise of the signal is present after a lapse of 16 msec from a rise of the previous trigger signal, it is decided that what is displayed at that time is the white character, and in step S115, the CPU 172 sets "1" at the N-th bit of the A-register associated therewith or of the code register formed in a predetermined area of the RAM 176. When no rise of the signal is present even after a lapse of 16 msec, the CPU 172 monitors this state until 2 msec elapses by a timer set immediately before (step S117), and when no rise of the signal is present even after a lapse of 2 msec, the CPU 172 decides that the code displayed at that time is of the black character, and in step S119, it sets "0" at the N-th bit of the code register.

Thereafter, in step S121, the CPU 172 decrements the associated counter, and also in step S123, it decides whether or not a carry or borrow has taken place in the decremented counter. When a carry has taken place, processing returns again to the second step S103 in FIG. 15 and the previous routine is executed, and if a carry has been outputted, this means that all of the three-bit code has been received, and processing returns to the main routine (FIG. 14).

Thus, in accordance with FIG. 15, the code of the same content as that of the code which is set by the image processing controlling part 400 by operating the operating part 408, that is, the code displayed by the CRT display 300 is loaded in the code register (not illustrated) of the robot controlling part 168. Then, in the control subroutine, predetermined controls are performed respectively according to the code thus restored.

In the control subroutine as shown in FIG. 16, when the code "110" is loaded, the CPU 172 gives a driving signal for forward rotation to the third motor 158 through the input/output control 170. Responsively, this motor 158 (FIG. 9) is rotated in the forward direction, and the arms 110 displaced by this motor 158 are moved upward. When the code "111" is loaded, this third motor 158 is rotated in the reverse direction, and responsively the arms 110 are moved downward.

When the code "101" is loaded, the CPU 172 gives a driving signal for forward rotation to the first motor through the input/output contriol 170. When this first motor 140 (FIG. 6) is rotated forward, the driving gear 138 coupled to the output shaft thereof is rotated, and responsively the follower gear 136 is also rotated forward, and the robot main unit 104 is rotated clockwise. If the code is "100", this first motor 140 is rotated reversely, and the robot main unit 104 is rotated counterclockwise.

When the code "010" is received, the CPU 172 gives a driving signal for forward rotation to the second motor 152 through the input/output control 170. When this second motor 152 is rotated forward, the arms 110 are opened as shown in FIG. 7A. On the other hand, when the code "011" is loaded, this second motor 152 is rotated in the reverse direction, and the arms 110 are put in a closed state as shown in FIG. 7B.

Then, if the received code is a code other than this, the CPU 172 deenergizes all of the motors 140, 152 and 158, returning to the main routine as shown in FIG. 14.

Thus, the image data from the image processing part 400 is displayed by the CRT display 300, and in the robot side, the robot controlling part 168 controls each part of the robot 100, particularly the arms 110 and the robot main unit based on the input from the image receiving part 108.

Accordingly, if, for example, as shown in FIG. 2, the press point 410L of the cross-shaped key switch 410 contained in the operating part 408 is depressed in a state wherein an object 200a is clamped by the arms 110 of the robot 100, responsively, the code "100" as shown in FIG. 11 is outputted, and "white, black, black" is displayed on the display 300 except for the trigger bit, and that code is received, and the first motor 140 is rotated reversely. Then, the robot main unit 104 is rotated counterclockwise, and the object 200a is brought to the position of an object 200b as shown in FIG. 2. Then, when the press point 410D of the cross-shaped key switch 410 is operated in this state, the code "111" is outputted, and "white, white, white" is displayed on the display 300 except for the trigger bit. Then, in the robot side, this image signal is received as the code "111", and the third motor 158 is rotated reversely. Then, the arms 110 are moved downward. Furthermore, when the key switch 414 contained in the operating part 408 is operated, the code "010" is outputted, and in the robot side, likewise, the second motor 152 is rotated forward, the arms 110 are opened as shown in FIG. 7A, and the clamped object 200a can be put on the object 200b. Thus, the robot 100 can be remote-controlled when facing the screen 302 of the CRT display 300 without applying a signal from the operating control directly to the robot 100.

Figure 17:
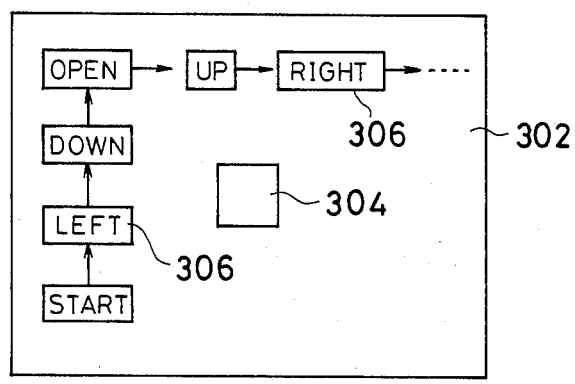
FIG. 17 is an illustrative view showing another example of an image display on a CRT display screen.

In the above-described embodiment, the robot 100 moves every time the operator operates the operating part 408. On the other hand, a series of operations can also be performed by storing same in advance in a register. That is, when the operator operates the operating part 407 and depress the register key (not illustrated) installed separately, this operation, that is, the code is registered (stored in the register, and by repeating the operation sequentially a series of controlling codes are registered. By operating a start key (not illustrated), the previously described code display, is received and robot control are executed. In this case, as shown in FIG. 17, the command contents are displayed in sequence as a message 306 on the screen 302 of the display 300 separately from the specific area 304 for displaying signals. Then, when the control of the robot 100 is executed, the currently executed step can be displayed clearly, for example, by flashing that message 306 or the like.

Such a display of the message 306 by means of the display 300 can be performed very easily in the case where the display for that signal is performed only in the specific area 304 on the screen 302. Also, the character generator can be utilized effectively also for displaying the message.

Figure 18:
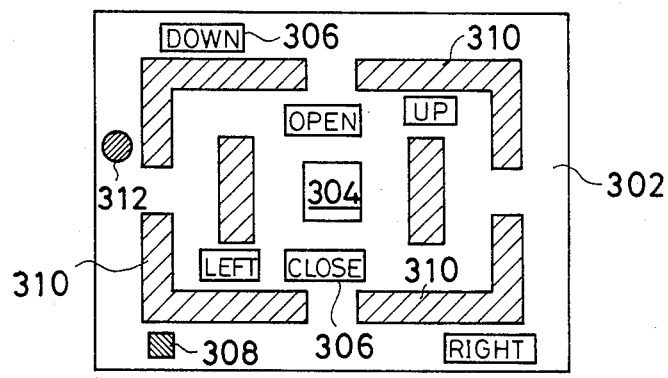
FIG. 18 is an illustrative view showing still another example of an image display on the CRT display screen.

Furthermore, a display as shown in FIG. 18 is considered as a specific application example of the display as shown in FIG. 17 to the gaming apparatus. In this case, in the operating part 408, a joy stick 430 as shown in FIG. 10 is provided in association therewith. Then, the character 308 displayed on the screen 302 of the display 300 can be moved on the screen by this joy stick 430. The method of moving such a character 308 (and a character as described later) on the screen is already well known, and therefore the description whereon is omitted here.

Then, the messages 306, 306,—are scattered at arbitrary places in a maze partitioned by the wall character 310 on the screen 302 of the CRT display 300 by operating the image processing part 400. A character 312 is programmed so as to chase the character 308.

By operating the joy stick 430 (FIG. 9), the operator moves the character 308 on the screen 302 so that this character 308 will draw near the position of the desired message 306. At this time, if the character 308 is caught by the character 312, the robot becomes uncontrollable in that state. If the character 308 can be made to draw near the message 306 successfully, the image processing controlling part 400 generates a code responding to that message, forming an image responding to the code in the specific area 304 on the screen 302. Then, the robot can perform a predetermined operation following the message. If the operator can make the robot execute a task, for example, disposition of the object 200 as described previously in reference to FIG. 2 while attempting to prevent character 308 from being caught by the character 312, a very interesting game is provided which is scored by counting the points obtained.

Figure 19:
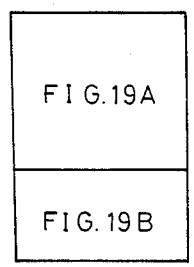
FIGS. 19, 19A and 19b are a flowchart showing another example of the subroutine for code restoration or code conversion in the robot controlling operation.

FIG. 19 is a flowchart showing another example of the subroutine for receiving the code in the robot controlling part. This FIG. 19 corresponds to FIG. 15, and in this embodiment, the four-bit code is received unlike the three-bit code as shown previously in FIG. 13. Also, in this example, a code "00010" is added as a start signal. Adopting such a complicated start signal "00010" is for preventing the robot from a malfunction due to a gaming character displayed on the screen 302 of the CRT display 300 or the like. Because such a bit configuration "00010" can scarcely take place in normal games or other games.

Figure 19A:
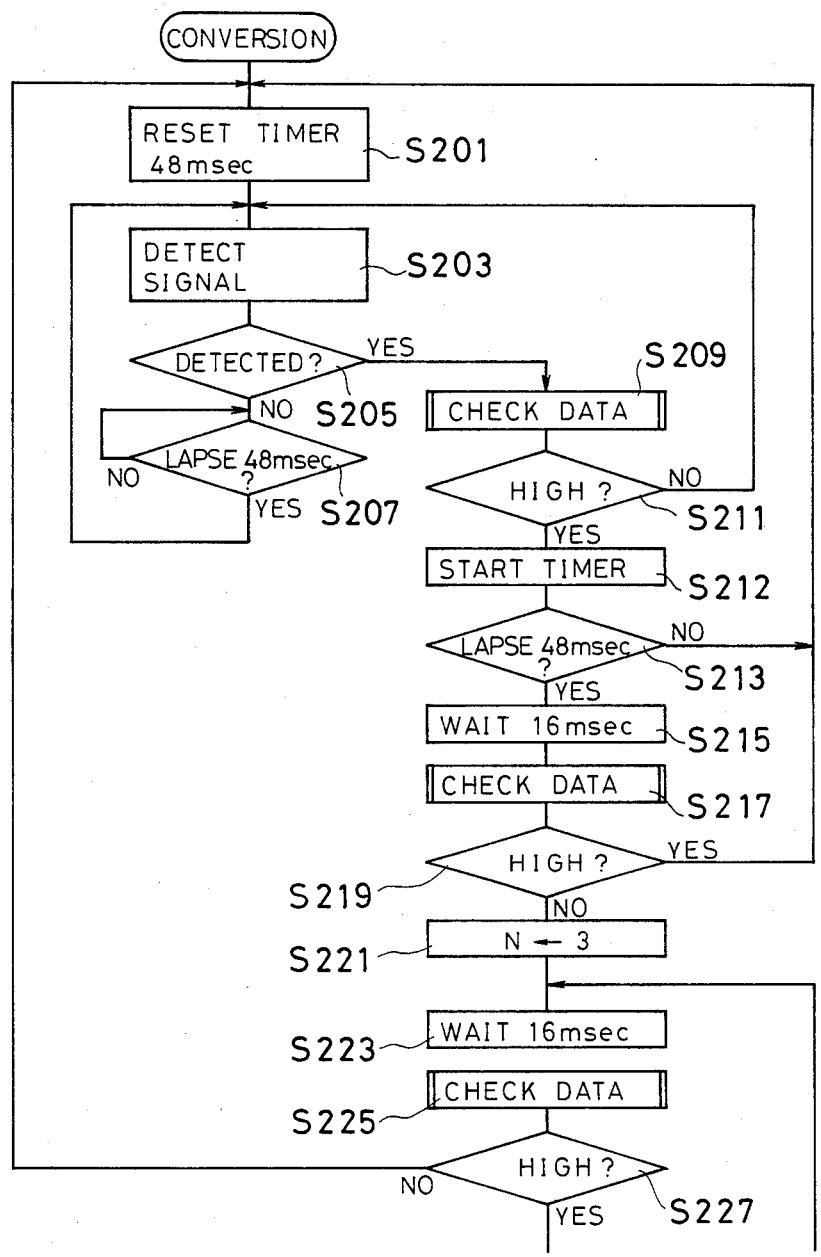
Figure 19B:
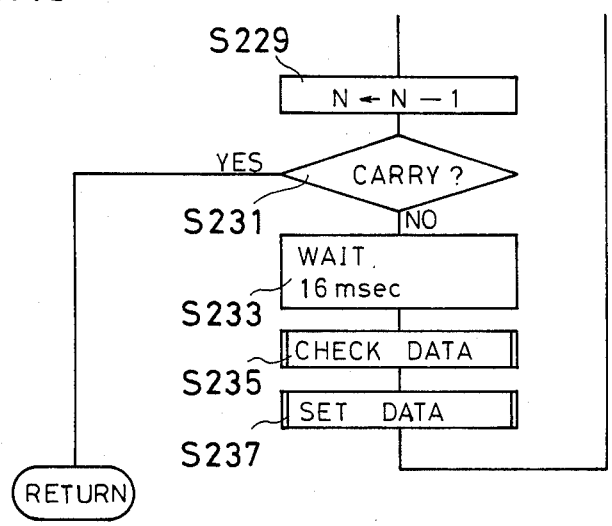

In the first step S201 as shown in FIG. 19 (FIG. 19A), the CPU 172 (FIG. 9) starts or resets a timer of 48 msec formed in the RAM 174 associated therewith. This timer, wherein one bit is about 16 msec, is for measuring the time during which the low level persists to detect the foremost three bits "000" out of the start signal "00010".

In the next step S203, the CPU 172 takes in or detects a signal from the input amplifier 128 (FIG. 9). Then, if the signal is detected in step S204, processing proceeds to step S209. If the signal is not detected in step 205 and a lapse of 48 msec is detected in step S207, processing returns again to step 203.

In step S209, decision is made on whether the signal is inputted from the input amplifier 128 is a light signal or a noise.

Figure 20:
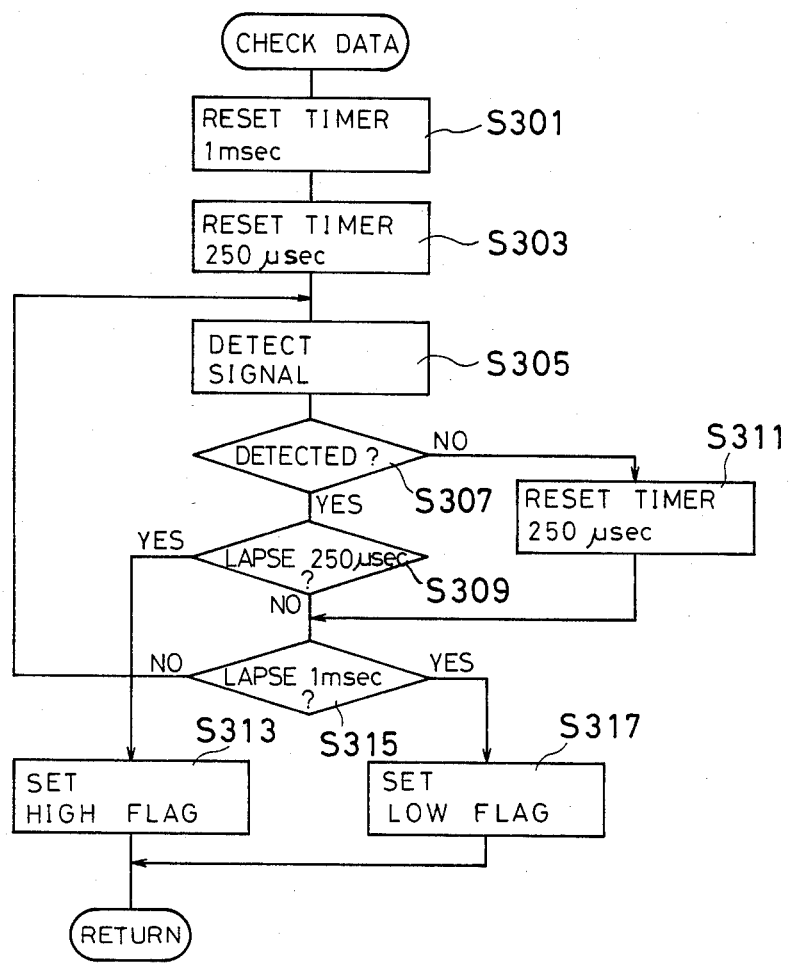
FIG. 20 is a flowchart showing a subroutine for identifying a code.

Here, description is made on this subroutine in reference to FIG. 20. This check data subroutine is for detecting whether or not a high level signal longer than 250 μsec in width exists during 16 msec-17 msec after confirming the data on the screen immediately before. Then, if a high level signal longer than 250 μsec in width exists, the data bit "1" is decided, and a high flag is set.

In the first step S301 of this subroutine, the CPU 172 resets or starts a timer of 1 msec. In the next step S303, it resets a timer of 250 μsec. Then, in step S305, the CPU 172 detects whether or not a high level signal exists. If a high level signal exists, step S309 is executed via step S307, and if no high level signal exists, processing proceeds to step S311 via step S307.

When the high level signal is being detected, the timer is incremented or decremented, and the lapse of 250 μsec is counted. If "YES" is decided in step S307 and the lapse of 250 μsec is decided in step S309, the CPU 172 sets a high flag in a predetermined area of the associated RAM In step S313.

If no high level signal is detected, the CPU 172 resets again the timer of 250 μsec in step S311, and decides the lapse of 1 msec in the next step S315. Accordingly, when no high level signal is detected or when the width is shorter than 250 μsec even if the high level signal is detected, after a lapse of 1 msec the CPU 172 sets a low flag in the next step S317 because of the low level or no signal during this period, and sets a low flag. Thus, discrimination between a normal signal and a noise is performed.

Reverting to FIG. 19 (FIG. 19A), in step S211, the CPU 172 checks the set flag and decides whether or not the data previously received is of high level. Then, if it is not of high level, a noise is decided, and processing returns to the previous step S203. Then, if a high flag is set in step S313 of FIG. 21 in the previous step S209, the CPU 172 gives a start signal the associated timer in step S212, thereafter it decides whether or not 48 msec has passed in the next step S213. In this step S213, when no signal "0" is present before a lapse of 48 msec even if the signal previously detected is of high level, processing is returned to the first step S201 because of not being the start signal "0001".

If the code "0001" is detected in step S213, a lapse of 16 msec equivalent to the final bit "0" of the start signal "00010" is waited in the next step S215, and then the subroutine as shown in FIG. 20 is executed again in step S217. If the code "1", that is, the high level is detected in step S219, the signal at this time is "00011", and this is not the start signal, and therefore processing returns again to the first step S201.

When "YES" is decided, that is, when the start signal "00010" is detected in step S219, the CPU 172, in the next step S221, sets a numeric value "3" in a counter (not illustrated) to detect a four-bit code or data following that start signal.

Figure 21:
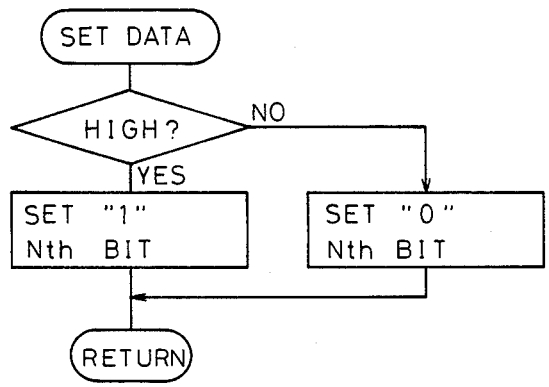
FIG. 21 is a flowchart showing a subroutine for setting the identified code.

Thereafter, in step S223, a lapse of 16 msec of a trigger signal is waited. Then, if no trigger signal exists after this lapse of 16 msec, processing is returned to the first step from step S227. Then, if the trigger signal can be confirmed, processing proceeds to step S229 from step S227, and the previously described counter is decremented. Then, in step S231, the CPU 172 decides whether or not a carry has been outputted from that counter, that is, whether or not all of the four-bit data have been detected. Then, if no carry is outputted, thereafter steps S233, S235 and S237 are executed, and sequential data bits are read until the value N of the counter becomes "0". That is, in step S237, as shown in FIG. 21, if the high level is detected in the previous check data subroutine, the code "1" is set at the N-th bit of the value of the counter, and if not, the code "0" is set at the N-th bit. Thus, all of the data can be read.

In accordance with this embodiment in FIG. 19, chances of malfunction can be reduced to a great extent in comparison with the case of FIG. 15 as previously described.

Figure 22:
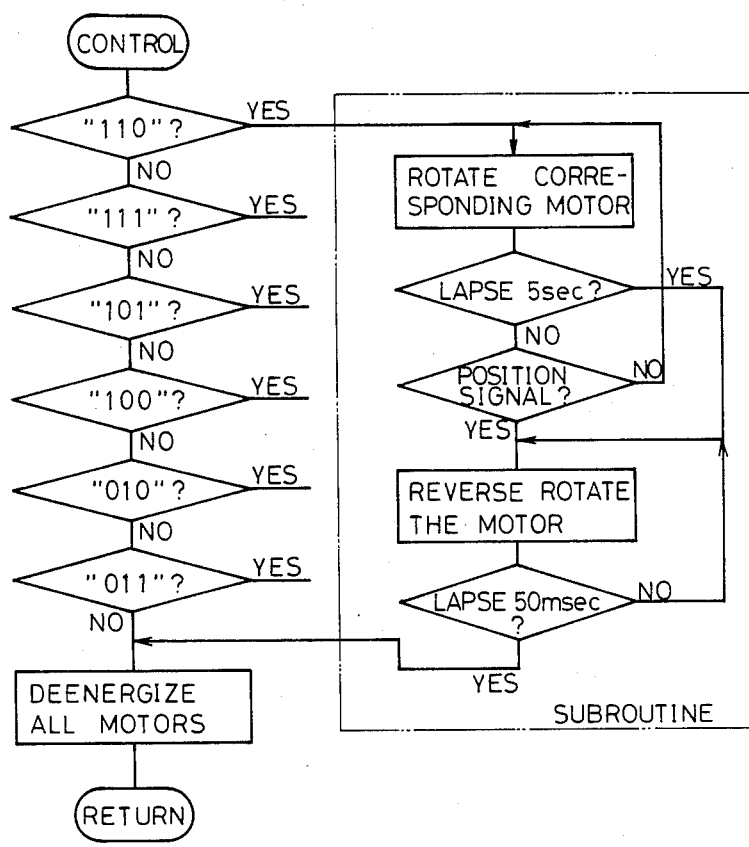
FIG. 22 is a flowchart showing another example of the control subroutine of the robot controlling operation.

FIG. 22 is a flowchart showing another example of the control subroutine. In this example, unlike the case of FIG. 16 as previously described, the respective motors 140, 152 and 158 are rotated in the directions as indicated initially, and the rotations thereof are made to persist until 5 msec elapses or until a positional detection signal is obtained. Thereafter, the rotations of these motors are reversed, being stopped after a lapse of 50 msec. That is, in this embodiment, the respective motors rotate for 5 msec, or continue to rotate until the positional detection signal is obtained, and a brake is applied by subsequent reverse rotation.

In the above-described embodiment, only the white character or the black character is displayed for a certain period of time in the specific area 304 on the screen 302 of the display 300, and only the brightness information out of the image is transmitted to the robot 100. However, it is considered also that a color image is displayed on the screen 302, namely, on the specific area 304, and the color information of the image is read at the robot 100 side, and thereby a command signal to the robot 100 is transmitted. In this case, the image receiving part 108 of the robot 100 is constituted, for example, as shown in FIG. 23.

Figure 23:
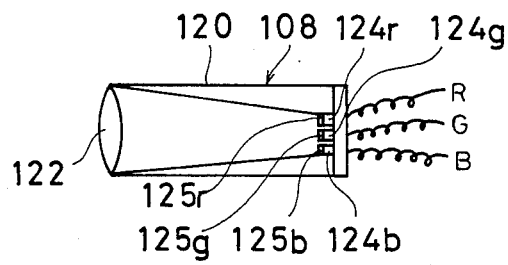
FIG. 23 is a cross-sectional illustrative view showing another example of an image receiving device.

In this embodiment as shown in FIG. 23, photo detectors 124r, 124g and 124b which individually receive the image information condensed by the condensing lens 122 are installed in the image receiving part 108. Then, color filter 125r, 125g and 125b which transmit only red, green or blue light respectively are mounted on the photo detecting surfaces of the respective photo detectors 124r, 124g and 124b. Accordingly, voltage signals responding to components of three primary colors R, G and B can be obtained from the photo detectors 124r, 124g and 124b, respectively. Then, in the CPU 172 (FIG. 10), decision is made on what color of display is performed on the specific area 304 based on such a voltage signal of R, G or B, and the code is received as described above in response to that "color", and thereby each part of the robot is controlled.

Thus, not only the brigtness information but also the color information can be utilized as the code display out of the image, and by combining them, a large number of command will be able to be transmitted to the robot side.

Furthermore, the content of a command can be transmitted to the robot also by the shape itself of the image other than the brightness information and the color information of the image. A simple figure, for example, a triangle, a square or the like is displayed on the screen 302 of the display 300, and photo detectors arranged in a dot-matrix fashion are installed in the image receiving part 108 of the robot 100, and the figure or shape is recognized in response to signals from the respective photo detectors, and thereby a specific code is received.

Furthermore, in the above-described embodiment, only the key switches are installed on the operating part 408. The robot 100 is controlled only depending upon whether or not the respective key switches or the press points thereof have been depressed, that is, whether or not they are turned on or off digitally. However, a joy stick 432 (refer to FIG. 24) similar to the joy stick 430 as shown in FIG. 9 is installed in placed of the cross-shaped key switch 410 installed on the operating part 408 as shown in FIG. 1, and thereby a continuous motion can be performed.

Figure 24:
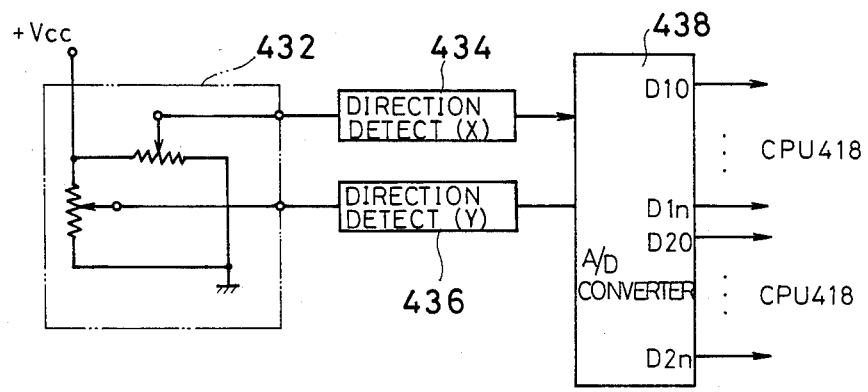
FIG. 24 is a schematic block diagram showing another example of an operating controller coupled to an image processing control component.

That is to say, in the embodiment as shown in FIG. 24, an output voltage from the joy stick 432 is received by direction detectors 434 and 436, and these direction detectors 434 and 436 discriminate the direction of movement of the joy stick 432 on X-Y plane according to the magnitude of the obtained voltage, and a voltage is given to an A-D converter 438 from the direction detector 434 or 436 which has detected that direction. The A-D converter 438 outputs a digital signal D10-D1n or D20-D2n in response to the voltage to be given. Such a digital signal is applied to the CPU 418 contained in the image processing controlling part 400 in a way similar to the case with the key code previously described. Then, in the CPU 418, based on the digital signal thus given, an image signal of the form (brightness, color or shape) responding to that digital signal is outputted from a character generator (not illustrated). It is displayed by the CRT display 300, and is received by the robot 100 in the same manner as described previously, and the robot 100 is controlled in response to the image. Thus, by enabling the analog input by employing the joy stick or the like, the robot 100 exhibits smooth motion, and also will be able to move more continuously and more proportionally.

In any of the above-described embodiments, no operating control for directly operating the robot is installed in the robot 100. However, as shown in FIG. 9, a robot operating part 180 may be installed in association with the robot controlling part 168. In this robot operating part 180, rotary direction inputting parts 182R and 182L for rotating the robot main unit clockwise or counter-clockwise, upward/downward direction inputting parts 184U and 184D for controlling the upward/downward motion of the arms 110 and open/close inputting parts 186O and 186C for opening or closing the arms 110 are installed. When these inputting parts 182L through 186C are operated, for example, a code as shown in FIG. 16 is stored directly in a CPU 127 or in the code register of the RAM 176 in response to that operation. For example, the direction inputting part 182 is operated, and when it is rotated in the clockwise direction a signal is given to the input/output control 170 from this inputting part 182. Responsively, the signal is transmitted to the CPU 172 from the input/output control 170 indicating that the inputting part 182 has been rotated clockwise associated signal has been inputted. Then in the CPU 172, a code store in advance in the RAM 174, for example, "101" is loaded in the code area thereof. Then, a control of the robot similar to the one as shown previously in FIG. 16 will be effected.

Additionally, in the above-described embodiments, the transmitted image is displayed using the specific area 304 on the screen 304 of the CRT display 300. However, the whole of the screen 302 may be used for such an image display. In this case, normal gaming characters and the like are displayed as usual, and when a command to the robot is intended to be transmitted, for example, the whole display screen is inverted in a black to white/white to black manner.

Although the present invention has been described and illustrated in detail, it is clearly understood that the same is by way of illustration and example only and it not to be taken by way of limitation, the spirit and scope of the present invention being limited only by the terms of the appended claims.

What is claimed is:

1. A robotic gaming apparatus comprising:
   a displaying means,
   an image signal producing means for producing an image signal for forming an image of a predetermined aspect on said displaying means,
   a robot,
   an image receiving means which is installed in said robot and is for receiving an image on said displaying means, and
   a controlling means which is installed in said robot and is for controlling motion of said robot based on a signal from said image receiving means.

2. A robotic gaming apparatus in accordance with claim 1, wherein said image signal producing means includes a code signal generating means for generating a code signal and an image signal generating means for generating an image signal in response to a code from said code signal generating means.

3. A robotic gaming apparatus in accordance with claim 2, wherein said image signal generating means includes a means for varying the brightness component of a display on said displaying means in response to a code, and
   said image receiving means includes means for detecting variation of said brightness component.

4. A robotic gaming apparatus in accordance with claim 3, wherein said means for varying the brightness component includes means for selectively generating a white or black character signal in response to a code.

5. A robotic gaming apparatus in accordance with claim 2, wherein said image signal generating means includes a means for varying the color component of a display on said displaying means in response to a code, and
   said image receiving means includes a means for detecting sad color component.

6. A robotic gaming apparatus in accordance with claim 2, wherein said image signal generating means includes a means for varying the shape of a display on said displaying means in response to a code, and
   said image receiving means includes a means for detecting said shape.

7. A robotic gaming apparatus in accordance with claim 2, which further comprises a means for forming a trigger bit between said codes.

8. A robotic gaming apparatus in accordance with claim 2, which further comprises a means for forming a start bit before said code.

9. A robotic gaming apparatus in accordance with claim 1, which further comprises a means for forming a character image for a game on said displaying means.

10. A robotic gaming apparatus in accordance with claim 9, which further comprises a means for moving a game character displayed on said displaying means.

11. A game apparatus used with a display that is capable of displaying variable images in response to electrical signals, comprising:

a game mechanism adapted to be positioned in spaced apart relation to said display, said game mechanism having a movable portion, image signal producing means for producing an electrical image signal to form an image on said display, including means for causing said image to change with time, image receiving means provided on said game mechanism for receiving the image formed on said display and for outputting a signal in accordance with the change of said image, and mechanism control means for controlling movement of said movable portion of said game mechanism in response to the signal output from said image receiving means.

12. A game apparatus in accordance with claim 11, said display is a raster scanning type CRT display which is scanned based on a predetermined frame frequency, and said image signal producing means includes means for producing the electrical image signal in synchronism with said frame frequency.

13. A game apparatus in accordance with claim 12, said image signal producing means includes means for generating at least one mechanism movement command, and means for converting said command into electrical image signals to form command images on said display.

14. A game apparatus in accordance with claim 13, said image signal producing means includes means for producing another electrical image signal to form a game image other than said command images on said display.

15. A game apparatus used with a raster scan type video display, comprising:

image signal producing means for producing an electrical image signal to form a command image on said raster scan type video display, an amusement device for responding to a command image formed on said raster scan type video display, image receiving means provided on said amusement device for receiving the command image formed on said raster scan type video display and including means for producing an output signal in accordance with said command image, said amusement device having a controllable component, and controlling means for controlling said component in accordance with a command associated with the output signal from said image receiving means.

16. A game apparatus in accordance with claim 15, wherein said controllable component includes a movable portion of said amusement device.

17. A game apparatus in accordance with claim 15, wherein said controllable component includes means on said amusement device for exhibiting a changed condition in response to said output signal.

* * * * *